June 16, 1942. C. F. WARREN ET AL Re. 22,122

POWER TOOL

Original Filed March 1, 1939 2 Sheets-Sheet 1

INVENTORS

Charles F. Warren

William R. Smith

BY Rene Cadofopen their ATTORNEY

June 16, 1942. C. F. WARREN ET AL Re. 22,122
POWER TOOL
Original Filed March 1, 1939 2 Sheets-Sheet 2
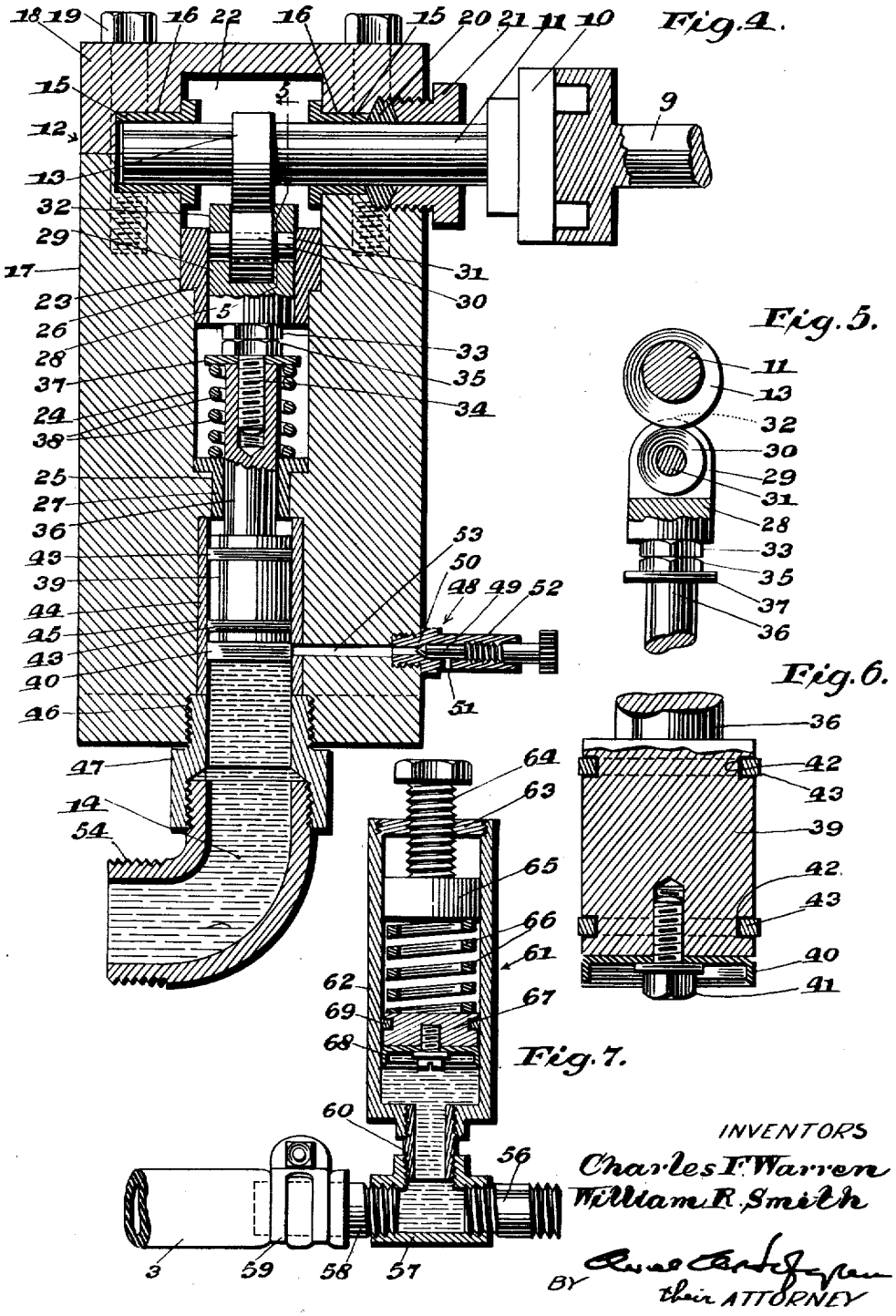

Reissued June 16, 1942 Re. 22,122

UNITED STATES PATENT OFFICE 22,122

POWER TOOL

Charles F. Warren, Milwaukee, Wis., and William R. Smith, Wynne, Ark., assignors to The S & W Hydraulic Tool Company, Wynne, Ark., a corporation of Arkansas Original No. 2,260,268, dated October 21, 1941, Serial No. 259,291, March 1, 1939. Application for reissue December 8, 1941, Serial No. 422,122

23 Claims. (Cl. 125—32)

This invention relates to improvements in power tools and one of its foremost purposes is to provide a tool for diversified uses, capable of delivering any degree of blows from the lightest to the heaviest within the power of the prime mover. An outstanding characteristic of the tool is the utilization of a liquid column as the force transmitting means, this particular provision avoiding the danger to personal safety which occurs in the event of a blowout in a power tool wherein compressed air or a similar fluid immediately constitutes the source of power.

With respect to the latter statement, pneumatic hammers, drills, tampers and the like are mechanical elements of common knowledge. Tools of this kind are inordinately heavy in the majority of instances and always require an air compressor unit consisting of an internal combustion motor and a compressor engine. These factors are brought to attention to emphasize the point that prevailing power tool equipment is not only heavy and cumbersome, but obviously expensive because of the accessories that are required.

Instances have been known wherein pneumatic power tools of the foregoing class have blown out. It is true that such instances are not frequent, but in the event of a breakage in the tool itself due to a fault in the metal, or a rupture of the pressure fluid-transmitting hose, serious consequences have followed either because of someone being struck by a fragment of metal or being struck by the recoil of the hose. With this preamble in mind the objects of the invention are as follows:

First, to provide a power tool which is fundamentally safe because of the avoidance of the use of a pressure medium such as compressed air, the latter being substituted by a liquid column which is the intermediary between the impulse member and the hammer, said column being devoid of inherent pressure and therefore not capable of producing an injury in the event of a breakage.

Second, to provide a power tool in which the driving effect of the hammer is derived solely from the application of a rapid succession of power impulses to a hydraulic column of which the hammer constitutes one of a pair of terminals.

Third, to provide a hydraulic impulse power tool which includes a recoil chamber somewhere in the liquid conduit, capable first of yielding in the event of a jamming of the hammer, thereby to avoid a rupture of the hose by an excess of back pressure, second, of being adjustable to vary the initial static pressure on the hydraulic column and so enable the grading of the hammer blows from zero to the heaviest capable of delivery by the prime mover.

Fourth, to provide a power appliance which has for its fundamental characteristic the confinement of a column of liquid in a conduit stopped up at its ends by closures which, although necessarily movable are backed up from the outside by springs of sufficient tension to prevent them from ever departing from the ends of the liquid column thus eliminating the chance of ever forming a vacuum and, what is of most importance, consolidating and maintaining the liquid column and its working parts into an aptly entitled mass-unit, the solidarity of said column also depending upon a locked pressure device branching off from and in communication with the column.

Fifth, to provide a power tool of the character described which is fundamentally simple, thereby to make it available to a large number of potential users who are at present prevented from having the advantages of such a power tool because of the prevailing high cost.

Other objects and advantages will appear in the following specification, reference being had to the accompanying drawings in which:

Figure 4 is a partially elevational and sectional view of the impulse member of the power unit.

Figure 5 is a cross section taken on the line 5—5 of Fig. 4.

Figure 6 is a sectional view of the impact piston of Fig. 4.

Figure 7 is a partially elevational and sectional view of the recoil chamber.

Figure 1:
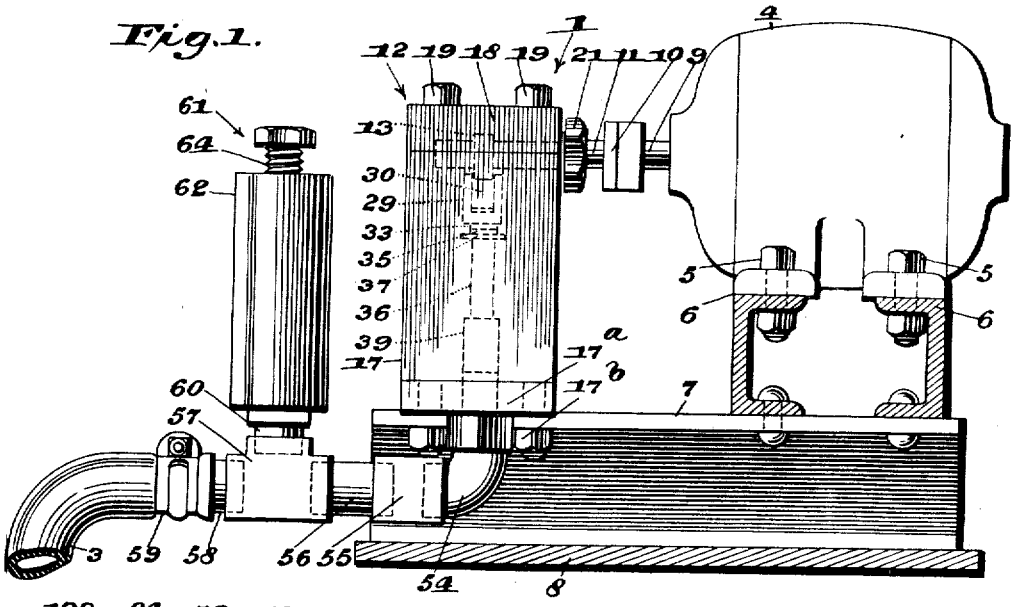
Figure 1 is a partially elevational and sectional view of the power unit of the tool.

In carrying out the invention provision is made of a power unit, generally designated 1, and a hand implement generally designated 2. The power unit as its name might imply, is adapted to be located at some stationary place, that is to say, the workman is free from it precisely as the workman who operates the known type of pneumatic hammer is free from the compressor unit that furnishes the power. The instant power unit 1 may be and usually is so arranged that it is readily transported from point to point. The hand implement 2, as its name implies, is wielded by the operator, the unit 1 and implement 2 being connected by a hose 3, this completing what has herein been termed the power tool.

Notwithstanding the fact that the power unit and the hand implement are located at a distance apart from each other, yet there is an inter-relationship between them which constitutes such a combination that the identity of a system is not to be overlooked. In other words, the power unit is functionless unless united with the hand implement and vice versa, the bond between the two being a column of liquid which is maintained in absolute solidarity both by fairly heavy springs at the closure terminals of the column and by a static pressure device that branches off from one side of the column with which it is in communication.

Referring first to the details of the power unit 1, it is observed in Fig. 1 that an electric motor 4 is employed as the prime mover. This motor may be of any desired horse power because the greater the rating of the motor the heavier will be the character of work capable of being done. For illustration, an ordinary half horse power motor has been demonstrated as being capable of driving heavy spikes through heavy timbers, driving holes through concrete and doing similar heavy work.

This motor is secured at 5 to the cross members 6 which are herein regarded as being parts of a frame 7. This frame is suitably secured to a base 8. The manner in which the motor 4 is mounted, and the manner of assemblage of the components of the power unit 1, are of little importance.

The driving shaft 9 of the motor (Fig. 4) is coupled at 10 in any desired way to the cam shaft 11 of the impulse member 12. This shaft is shown to have a single cam 13 affixed to it (Fig. 5), but in practice the cam 13 may have two lobes or it may have even more if the multiplication be desired. The purpose in pluralizing the cam 13 would be to step up the impulses delivered to the liquid column 14.

Bushings 15 provide bearings for the cam shaft 11. These bushings are fitted tightly in bores 16 which occur partly in the body 17 of the impulse member 12 and partly in the cap 18 thereof. The latter is secured by bolts 19 which if it be so desired, could be substituted by studs fixedly driven in the body 17, projectible through openings in the cap 18 and threaded to receive securing nuts.

In either event the bushings 15 are clamped firmly in position so as not to turn, and in order to avoid the possibility of any liquid leakage a packing 20 and gland 21 are added, as shown. A packing provision such as this is not needed at the left end of the shaft 11 because this is confronted by the closure wall of the body 17 and cap 18.

The body 17 is flanged at 17a (Fig. 1). There is one of these flanges on opposite sides of the body, and they rest upon the matching channels of the frame 7. Bolts and nuts 17b are used to secure the flanges to the channels, and the latter are made tall enough so that parts emerging from the bottom of the body 17 will clear the base 8.

A chamber 22 provides the operating space for the cam 13. This chamber appears as a bore 23 in the body 17. The latter has a succession of counterbores 24, 25, each defining a shoulder. Bushings 26, 27 are driven tightly into the various counterbores until they rest upon the respective shoulders. A cylindrical head 28 is slidably mounted in the bore of the bushing 26. This head is made cylindrical largely for convenience in manufacture. It is possible to make it cross sectionally non-circular, but to do so involves a somewhat greater cost.

The head 28 is forked at 29. A roller 30 is journalled between the forks. Said roller may either turn on the axle 31, in which event the ends of the axle would be fixed in the fork, or the roller may be made rigid with the axle in which event the ends of the latter would turn in the fork.

It is to be observed that the crest 32 of the fork 29 extends above the periphery of the roller 30 (Fig. 5). This makes the cam 13 ride inside of the fork and in doing so automatically prevents turning of the head 28 in the bushing 26 because of the bearing of the fork crests against the side walls of the cam 13.

A tappet 33 constitutes the important support of the head 28 (Fig. 4). This tappet is nothing more than a threaded shank 34 with an exposed head on which the cylindrical head rides. A jam nut 35 is added to lock the adjustments of the tappet in respect to a plunger 36 which carries it. The tappet adjustment is initially necessary to establish a minute but proper clearance between the peripheries of the cam 13 and roller 30 and to maintain that clearance when wear occurs after long use of the tool.

A washer 37 is interposed between the jam nut 35 and the adjacent end of the plunger 36. This washer provides an abutment for one end of a spring 38, the other end of which bears on the flange of the bushing 27. It is in the bore of the latter that the plunger 36 is slidably mounted. This plunger is part of a piston 39, herein known as the impact piston because it delivers the blows of the cam 13 directly to the liquid column 14, of which column the piston 39 is one terminal.

The piston 39 has a cup leather 40 at its working end. This leather is affixed by a screw 41 or some desired equivalent. The piston has one or more ring lands 42 equipped with steel rings 43. These rings ride the internal wall of a bushing 44 which constitutes a cylinder for the piston. This bushing is fitted tightly in the counterbore 45 of a threaded bore 46 introduced into the body 17 from the end opposite to that from which the previously mentioned bore 23 and counterbores 24, 25 are driven.

A nipple 47 is screwed into the bore 46. It serves to keep the bushing 44 in place, although the tight driving of the latter would adequately accomplish that purpose. It is observed in Fig. 4 that the liquid column 14 extends through the nipple 47 up to the impact piston 39. As the cam 13 rotates with the shaft 11 the successive impacts thereof against the roller 30 drive the piston 39 outwardly and impart a rapid succession of blows to the liquid column. Inasmuch as the liquid is virtually incompressible, it follows that the impacts are delivered thereby with no perceptible diminution.

While on the subject of the impulse member 12, it is observed in Fig. 4 that the liquid column is supplemented with a bleeder 48. This consists of a manually turnable needle valve 49 which is adapted to engage a seat 50 for closure. A lateral opening 51 in the casing 52 of said valve provides for the escape of entrapped air from the liquid column 14, through a duct 53 that communicates with the interior of the cylinder 44.

An elbow 54 (Fig. 4) is screwed into the nipple 47. A coupling 55 (Fig. 1) joins the elbow to a short fitting 56 (Figs. 1 and 7). This fitting is screwed into a T 57. A similar fitting 58 is screwed into this T and one end of the previously mentioned hose 3 is secured to this fitting by a clamp 59 of any desired type. A third fitting 60 is screwed into the T 57 and it is this fitting which carries the recoil chamber 61.

As shown in Fig. 7, the recoil chamber 61 consists of a cylinder 62 into the reduced end of which the fitting 60 is screwed. The other end of this cylinder has a threaded closure 63 which adjustably carries a screw 64. This screw constitutes the abutment for a fairly heavy washer 65 against which one end of a spring 66 bears.

At this point it is desired to state that instead of making the recoil chamber 61 separate from the body 17 as herein disclosed, it is quite feasible to incorporate it within the body. It is thought unnecessary to illustrate this modification because a bore in the body 17 (Fig. 4) equivalent to the internal diameter of the cylinder 62, is readily visualized. The chief advantage in incorporating the recoil chamber in the body 17 lies in manufacture, but the arrangement in Fig. 1 will be employed quite commonly.

The other end of the spring 66 presses against a piston 67 which, like the piston 39, has a cup leather 68, and at least one ring 69. It is plainly seen in Figs. 1 and 7 that the liquid column 14 extends into the recoil chamber 61, the chamber 62 of the latter constituting a lateral branch of the liquid column.

The spring 66 is quite heavy and does not yield under ordinary circumstances. But if by chance there should be a jamming of the hammer later described, so that the back pressure in the liquid column might tend to burst some of the parts, the spring 66 will yield under the excess pressure and thus act as a safety device. On the same principle the recoil chamber is made to serve as a governor. The pressure of the spring 66 upon the piston 67 and so upon the lateral branch of the liquid column 14, can be diminished by unscrewing the screw 64.

The result of this unscrewing is to provide a lateral outlet, so to speak, for the power impacts delivered to the column 14. This, in turn, lessens the force of the impact delivered to the hammer. Conversely, the intensity of the power impacts upon the liquid column can be increased by turning the screw down. The screw adjustment thus serves the purpose of regulating the static pressure upon the liquid column, and as has been brought out before, it is not material where the static pressure device is located in reference to the conduit nor, in fact, is it material that the specific form in Fig. 7 be adhered to.

The intended purpose is served by requiring the member 61 to function as a static pressure device. As such it imposes a predetermined pressure upon the liquid column which when superimposed upon the tension of a spring later described, establishes an inherent column frequency higher than that of the blows adapted to be delivered to it. Thus the liquid column will not be subject to a reverberating wave action which if permitted would require the use of a wave absorber or trap.

Figure 2:
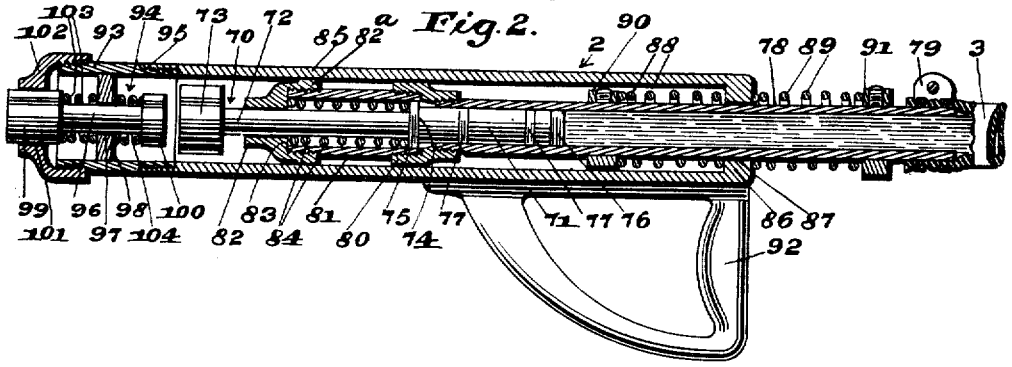
Figure 2 is a longitudinal section of the hand implement which is operable by the power unit.
Figure 3:
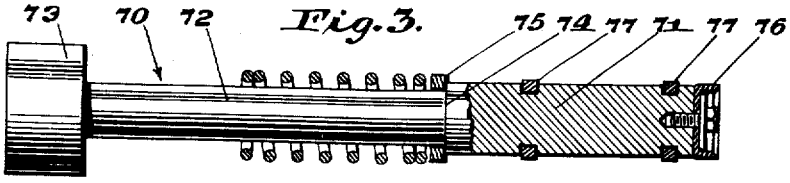
Figure 3 is a detail view partially in elevation and section of the reciprocable hammer.

Attention is next directed to the second component of the tool, namely, the hand implement 2. The previously mentioned hammer is generally designated 70 (Figs. 2 and 3). This hammer comprises the piston 71, hammer shank 72, and hammer head 73. These three parts can be assembled in any desired way; they may be integral if preferred. The shank 72 is of less diameter than the piston 71. This provides a shoulder 74 (Fig. 3) against which the spring abutment washer 75 is rested. The piston 71 has a cup leather 76 at its working end and it has one or more rings 77.

A long tube 78 (Fig. 2) provides both the cylinder for the piston 71 and the place of connection of the other end of the hose 3. Said connection is made by a clamp 79 or some equivalent.

A coupling 80 connects a spring tube 81 at one of its ends to the long tube 78. A reducer 82 on the other end of the spring tube 81 provides a bearing for the hammer shank 72. The reducer is shouldered at 83 to serve as an abutment for that end of the spring 84 opposite to the one which bears against the abutment washer 75. Said reducer has a peripheral flange 82a which bears on the wall of the hammer casing and provides a guide. The spring is housed by the tube 81 hence the name spring tube.

The hammer casing 85 contains most of the parts of the implement 2. The hammer 70 and the tube 78 which carries it is in floating relationship to the hammer casing. Said casing has a closure 86 at one end. This closure has a bore 87 in which the tube 78 is capable of reciprocation. Said closure also constitutes the common abutment for the inner end of a pair of springs 88, 89 on the tube 78. Set collars 90, 91 on said tube provide bearings for the remote ends of said springs. These springs are equalizers. They serve to maintain the tube 78 and its immediately carried parts in what might be called a normal position in reference to the hammer casing 85. Said springs are also shock absorbers because without them it would be virtually impossible to wield the implement 2 with the power unit 1 in operation. The wielding is done through a handle 92. The operator grasps this and directs the implement 2 wheresoever he will.

An extension 93 of the casing 85 carries what is generally designated an anvil 94. The extension is removably attached at 95 to the casing 85, the purpose of detachment being to provide access to the inner end of the anvil.

A further purpose of the movable attachment of the extension 93 at 95, which attachment comprises the screw threads shown, is to enable the adjustment of the extension in respect to the casing 85 and thereby to regulate the position of the anvil 94 in relationship to the hammer head 73. It is entirely practicable to make the screw threads at 95 tight enough to insure the maintenance of the extension 93 in the adjusted position. If the screw threads cannot be relied upon for this function then it is regarded as an obvious expedient to employ some known clamping device that will fix the extension when adjusted.

The anvil comprises a stem 96 which is slidable in the bore 97 of a partition 98. The latter is secured in the extension 93 in any desired way, for example by spot welding. Strikers 99, 100 are attached to the respective ends of the stem 96. The first of these is guided in the bore 101 of a cap 102 at which the tip of the striker 99 is exposed. The other striker 100 is in normally spaced relationship to the head 73, but the space is taken up by the natural downward pressure of the implement against the work when the handle 92 is grasped.

Springs 103, 104 bear against the strikers 99, 100 at their remote ends and bear commonly against the partition 98. These springs serve to keep the anvil 94 in a normal position in the end of the casing 85, and yield only when the hammer head 73 is brought to bear against the anvil in the manner previously stated.

The operation is readily understood. The motor 4 is connectible with a source of electric current usually being controlled by a switch (not shown). The revolution of the drive shaft 9 (Fig. 4) actuates the cam 13 so that impacts are delivered to the cylindrical head 28 in rapid succession. The number of impacts will be at least one for every revolution of the drive shaft. As previously pointed out the number of impacts can be multiplied by using plural cams.

The spring 38 (Fig. 4) tends to keep the piston 39 in its outward position in the liquid conduit. As each impact is delivered to the cylindrical head 28 the spring 38 yields, permitting the impact to be transferred to the liquid column 14. By tracing this column from Fig. 4 to Fig. 2 by way of the hose 3, it is seen that each impact is delivered to the piston 71 of the hammer 70. The operator supposedly has the implement 2 in his hand. The anvil 94 is rested against the work. The spring 103 yields, thereby permitting the engagement of the striker 100 with the hammer head 73.

The impacts against the piston 71 of the hammer 70 are delivered to the work through the anvil 94. There will be some vibration of the long tube 78. The amplitude of vibration will, however, be less than that of the hammer 70. This fact is due to the inertia of the tube 78. The extension of the hammer 70 by force of a blow will, naturally, partially compress the spring 84. The resultant motion is transferred to the tube 78. But the latter, due to the inertia mentioned, exhibits a tendency to lag under the impetus of the motion of the spring 84, thus permitting a pronounced outer motion of the hammer upon the application of the first hydraulic impact.

When this action is multiplied with extreme rapidity the result is a free vibration of the hammer 70, but a retarded vibration of the tube 78. There will also be some vibration of other parts of the conduit, for example, the hose 3. But this is not objectionable, and the fact that vibration occurs in the conduit does not diminish the effectiveness of the hammer 70 in the least. Nor does the vibration which is transmitted to the hammer casing 85 through the instrumentality of the springs 88, 89, disturb the operator. These springs absorb much of the shock due to the diminished vibration of the tube 78.

There is another factor which it is desired to bring out. According to the present showing the inside diameter of the liquid conduit is the same from beginning to end. That is to say, the inside diameter of the tube 78 (Fig. 2) is the same as the inside diameter of the cylinder 44. The degree of the blows imparted by the liquid column in this conduit can be varied by changing the sizes of the cylinder 44 and tube 78 without changing the size of the motor 4. By varying the relative diameters of the impact piston 39 and hammer piston 71 it is in turn possible to vary the power impacts and length of strokes. For example, an increase in the inside diameter of the cylinder 44 will produce a much harder power impact against the hammer 70 than when the conduit is of the previously mentioned uniform size.

The recoil chamber 61 (Fig. 7) has the primary purpose of keeping the pressure of the liquid column uniform. Any tendency toward fluctuation in the latter is smoothed out by the resiliently backed piston 67. The recoil chamber is also capable of producing changes in the force of the blows of the hammer 70 because by backing off the screws 64 the pressure on the liquid column will be lessened and this in turn will produce some dispersion of the power impacts delivered in the impulse member 12.

In conclusion it is desired to point out that the earlier reference to the electric motor 4 (Fig. 1) is not to be regarded as a limitation on the prime mover capable of employment. This motor may be substituted by a gasoline engine, in fact by any type of motor capable of turning the shaft 9 at a high rate.

Further reference is desired to be made to the hand implement 2. This too is not to be considered as a limitation for this reason; it is conceivable that the power impulses delivered to the hydraulic column 14 are not necessarily terminated at the hammer of a manually wieldable implement. The latter can be set in a perfectly rigid position.

In such an event the casing 85 is not necessarily used. The tube 78 of the hammer and tube assemblage 70, 78, would then be held stationary and the vibrations of the hammer head 73 would be applied to the work with virtual disregard as to what its nature might be. For instance, the reciprocable hammer might be the reciprocable element of a jig saw or it may be applied to some other type of power tool.

We claim:

1. An impact implement consisting of a casing, a tube slidable in said casing and constituting one terminal of a hydraulic column, a hammer reciprocable in said tube and abutting the hydraulic column, an anvil in spring-floated relationship to the hammer, means guiding the tube and hammer assemblage in the casing and in respect to said anvil, and shock absorber means abutting portions of both the casing and tube, floating the tube and hammer assemblage in said sliding relationship.

2. An impact implement consisting of a casing having an abutment at one end, a tube constituting one terminal of a hydraulic column, said tube partly occupying the casing and being slidable in said abutment, a piston structure reciprocable in the inner end of the tube and having a shoulder, a spring exerting pressure at one end against said shoulder, means containing the spring, providing an abutment for the other end of the spring and supporting a part of the piston structure, and means coupling the spring-containing means to the tube thus unifying the containing means and tube, said coupling means engaging the wall of the casing to provide a slidable support.

3. An impact implement consisting of a casing having an abutment at one end, a tube constituting one terminal of a hydraulic column, said tube partly occupying the casing and being medially slidable in said abutment, collars attached to the tube at the respective sides of the abutment, springs carried by the tube commonly resting against the abutment and engaging the respective collars, a piston structure reciprocable in the inner end of the tube and having a shoulder, a spring exerting pressure at one end against said shoulder, a tube containing the spring and having means against which the other end of the spring is rested, and a coupling securing the two tubes to each other, said coupling engaging the wall of the casing and having a slidable fit thereagainst to assist in the support of both tubes.

4. An impact implement consisting of a casing having an abutment at one end, a tube constituting one terminal of a hydraulic column, said tube partly occupying the casing and being reciprocable relatively to said abutment, a pair of springs carried by the tube and engaging the abutment on opposite sides, collars attached to the tube against which the respective springs are rested, a piston reciprocable in the inner end of the tube, a hammer shank extending from the piston and being of smaller size to define a shoulder, a spring carried by said hammer shank exerting pressure at one end against said shoulder, a tube containing the spring, and a pair of coupling members secured to the spring tube, one of said members connecting the two tubes together, the other providing an abutment for the last-named spring, both couplings engaging the wall of the casing to provide a slidable support.

5. An impact implement consisting of a casing having an abutment at one end and a partition at the other end, a tube constituting one terminal of a hydraulic column, said tube partly occupying the casing and being reciprocable relatively to said abutment, resilient means mutually interengaged with the tube and said abutment for equalizing the tube in respect to the casing, a piston and hammer structure reciprocable in the inner end of the tube, a resilient device exerting pressure against said structure, tending to resist impacts delivered to such structure, means carried by the tube in turn carrying said resilient device so that the reactions of said resilient device are delivered to the tube, and an anvil slidably carried by the partition, being in striking position in reference to the piston and hammer structure.

6. An impact implement consisting of a casing having an abutment at one end and a partition at the other end, a tube constituting one terminal of a hydraulic column, said tube partly occupying the casing and being reciprocable relatively to said abutment, resilient means mutually interengaged with the tube and said abutment for equalizing the tube in respect to the casing, a piston and hammer structure reciprocable in the inner end of the tube, a resilient device exerting pressure against said structure, tending to resist impacts delivered to such structure, means carried by the tube in turn carrying said resilient device so that the reactions of said resilient device are delivered to the tube, an anvil slidably carried by the partition, being movable to striking position in reference to the piston and hammer structure, and a resilient equalizer means carried by the anvil and situated partly on each side of the partition, said equalizer means engaging both the partition and portions of the anvil and serving to keep the anvil in a normal position.

7. An impact implement consisting of a casing having an abutment at one end, a tube constituting one terminal of a hydraulic column, said tube partly occupying the casing and being reciprocable relatively to said abutment, a piston structure reciprocable in the inner end of the tube, a spring exerting pressure at one end against said piston, and means carried on the tube containing the spring, providing an abutment for the other end of the spring and supporting a part of the piston structure, said means engaging the wall of the casing to provide a slidable support.

8. An impact implement consisting of a casing having internal abutment means, a tube constituting one terminal of a hydraulic column, said tube being slidably guided by the abutment means and in turn having abutment means outstanding therefrom, a pair of springs mutually engaging the abutment means of the casing and tube to sustain the tube in floating relationship to the casing insofar as axial movement is concerned, a piston contained by the tube, confronting the contiguous end of the hydraulic column and therefore being adapted to receive power impacts delivered through said column, said piston having abutment means, and an expansion spring pushing against a part of the tube and against the abutment on the piston thereby to tend to drive the piston against the hydraulic column.

9. An impact implement consisting of a casing, a tube reciprocably mounted in the casing, opposed resilient means commonly abutted against a portion of the casing and against spaced portions of the tube for equalizing the tube in a normal position in the casing and providing a shock absorbing connection between the tube and the casing, said tube being adapted to be supplied from one end with a percussive fluid, and a hammer reciprocably fitted in the other end of said tube.

10. An impact implement consisting of a casing having an annular abutment therein, a tube slidable in said abutment, springs carried by said tube and engaging opposite sides of the abutment, and maintaining a floating relationship of the tube to the casing, and a hammer reciprocable in one end of said tube in response to fluid impacts in said tube.

11. In combination a conduit, said conduit containing a liquid column, a movable closure for each end of the conduit in direct contact with the ends of the column, a spring backing the closure at one end of the column, means for imparting strokes to the closure at the other end of the column for delivery through the column to the spring-backed closure, a static pressure device branching off from said conduit at a point beyond the farthest inward movement of the inner end of either closure, thus affording communication of the column with said device and the integrity of a head of said liquid from the column, said device embodying a piston in direct and sole superimposition upon said head, and means acting on said piston for maintaining said liquid column at a pressure sufficient to give the liquid column a frequency exceeding that of the strokes imparted by said stroke-imparting means, thereby to insure the rigidity of the column and its immunity to a wave action.

12. In combination a conduit, a blow-receiving closure in one end of the conduit, a work-producing closure in the other end of the conduit, a spring backing the second closure, said conduit and closures confining a rigid reciprocable column of liquid with the inner ends of the closures being in direct contact with the ends of the reciprocable column, pressure head means in permanent and uninterrupted communication with the conduit and maintaining the column of liquid under a perpetual pressure for not only definitely fixing the column and closures as a solid mass-unit capable of instantaneous reciprocation and for maintaining said column of liquid and closures as an integral formation but for partially compressing the spring, and means imparting strokes to the blow-receiving closure for reciprocating the column and closures as an integral formation in one direction while simultaneously further compressing the spring, said spring returning the integral formation between the strokes of said stroke-imparting means.

13. In combination, a conduit, a blow-receiving closure in one end of the conduit, a work-producing closure in the other end of the conduit, a spring backing the second closure, said conduit and closures confining a rigid reciprocable column of liquid with the inner ends of the closures being in direct contact with the ends of the reciprocable column, means placing the column of liquid under a constant pressure for not only definitely fixing the column and closures as a solid mass-unit capable of instantaneous reciprocation and for maintaining said column of liquid and closures as an integral formation but for partially compressing the spring, and means imparting strokes to the blow-receiving closure for reciprocating the column and closures as an integral formation in one direction while simultaneously further compressing the spring, said spring returning the integral formation between the strokes of said stroke-imparting means.

14. A hydraulic power transmission device comprising a conduit, said conduit containing a liquid column, a movable closure for each end of the conduit in direct contact with the ends of the liquid column, a spring backing the closure at one end of the column, means for imparting strokes to the closure at the other end of the column for delivery through the column to the spring-backed closure, a fixed pressure device branching off from and in communication with said conduit thus establishing communication of the column with said device, and means within said device bearing down on the liquid column for maintaining said column at a fixed-pressure sufficient to give the liquid column a frequency exceeding that of the strokes imparted by said stroke-imparting means, thereby to insure the rigidity of the column and its immunity to waive action.

15. An impact implement comprising a cylinder and reciprocable piston, resilient return means acting against the outer end of said piston, a conduit having one of its ends terminated at said cylinder, said conduit being flexible in nature and extending off from said implement to a point of remote termination of its other end, a reciprocable force-receiving closure in said other end of the conduit, said conduit together with the piston in said one end and the closure in the other end confining a rigid reciprocable column of liquid in direct and perpetual contact with the inner ends of said piston and closure, pressure means in communication with the column placing the column under a predetermined pressure and volume for a given operation for not only maintaining and regulating the rigidity of said column together with said piston and closure as a solid mass-unit formation capable of instantaneous reciprocation, but also for initially and partially compressing and energizing the resilient return means to establish a preliminary and constant loading of the return means thereby maintaining a predetermined length of stroke of the piston and regulating the pressure on said return means and the position of the piston with reference to said resilient return means, and means for imparting rapid periodic strokes to said closure for moving said mass-unit formation in one direction while simultaneously further compressing and energizing the resilient return means, said return means rapidly returning the mass-unit formation between the strokes of said force-imparting means.

16. An impact implement consisting of a casing, a tube constituting one terminal of a hydraulic column, said tube being reciprocably mounted in said casing, a pair of resilient devices interposed between the casing and tube yieldably to sustain the tube in a normal position longitudinally of the casing and to serve as shock absorber connections therebetween, a piston reciprocable in the tube, confronting the contiguous end of the hydraulic column and therefore being adapted to receive power impacts delivered through said column, and resilient means interposed between a part of the tube and the piston thereby to tend to drive the piston against the hydraulic column.

17. An impact implement consisting of a casing element, a tube element reciprocably supported in the casing element, resilient means interposed between one of said elements and spaced portions of the other element providing yieldable shock absorbing connections between the tube element and the casing element, said tube element being adapted to be supplied from one end with a percussive fluid, and a hammer reciprocably fitted in the other end of said tube element.

18. In combination, a conduit, a blow-receiving closure in one end of the conduit, a work-producing closure in the other end of the conduit, means backing the second closure including a resilient device deformable under pressure, said conduit and closures confining a rigid reciprocable column of liquid with the inner ends of the closures in direct contact with the ends of the reciprocable column, means placing the column of liquid under a constant pressure for not only definitely fixing the column and closures as a solid mass-unit capable of instantaneous reciprocation and for maintaining said column of liquid and closures as an integral formation but for partially deforming and energizing said resilient device, and means imparting strokes to the blow-receiving closure for moving the column and closures as an integral formation in one direction while simultaneously further deforming and energizing the resilient device, said resilient device returning the integral formation between the strokes of said stroke-imparting means.

19. A hydraulic power transmission device comprising a conduit, said conduit containing a liquid column, a movable closure for each end of the conduit in direct contact with the ends of the liquid column, resilient means backing the closure at one end of the column, means for imparting rapid periodic strokes to the closure at the other end of the column for delivery through the column to the resiliently-backed closure, a pressure device branching off from and in communication with said conduit thus establishing communication of the column with said device, said means within said device bearing down on the liquid column for maintaining said column at a pressure sufficient to give the liquid column a frequency exceeding that of the strokes imparted by said stroke-imparting means, thereby insuring the rigidity of the column.

20. An impact implement comprising, in combination, a conduit containing a liquid column, a work-producing closure for one end of the conduit, a blow-receiving closure for the other end, said conduit together with the closures confining a rigid reciprocable column of liquid in direct and perpetual contact with the inner ends of said closures, resilient return means operable to move the work-producing closure in one direction, means for imparting rapid periodic strokes to said blow-receiving closure for moving said mass-unit formation in the other direction while simultaneously further deforming and energizing the resilient return means, said return means rapidly returning the mass-unit formation between the strokes of said force-imparting means, pressure device branching off from and in communication with said conduit and operable to maintain said liquid column at a pressure sufficient to give the liquid column a frequency exceeding that of the strokes imparted by said stroke imparting means, thereby insuring the rigidity of the column.

21. An impact implement comprising, in combination, a conduit containing a liquid column, a work-producing closure for one end of the conduit, a blow-receiving closure for the other end, said conduit together with the closures confining a rigid reciprocable column of liquid in direct and perpetual contact with the inner ends of said closures, resilient return means operable to move the work producing closure in one direction, pressure means in communication with the column placing the column under a predetermined pressure and volume for a given operation for not only maintaining and regulating the rigidity of said column together with said closures as a solid mass-unit formation capable of instantaneous reciprocation, but also for initially and partially deforming and energizing the resilient return means to establish a preliminary and constant loading of the return means thereby maintaining a predetermined length of stroke of the closure for the one end of the conduit and regulating the pressure on said return means and the position of said closure with reference to said resilient return means, and means for imparting rapid periodic strokes to said blow-receiving closure for moving said mass-unit formation in the other direction while simultaneously further deforming and energizing the resilient return means, said return means rapidly returning the mass-unit formation between the strokes of said force-imparting means.

22. An impact implement having, in combination, a casing element, a second element reciprocably supported in the casing element, a reciprocating device carried on second element, means for reciprocating said device, and resilient means interposed between one of said elements and spaced apart portions of the other element yieldably to maintain said second element in a normal position longitudinally of the casing element and providing a yieldable shock absorbing connection between the second element and the casing element to reduce the transmission of vibration between said elements.

23. An impact implement having, in combination, a casing element, a tubular element reciprocably supported in the casing element and adapted to contain one end of a liquid column, a reciprocating device fitted in said tubular element to be acted upon by said liquid column, oppositely directed abutments on one of said elements, opposed abutments spaced apart on the other of said elements, and a resilient device interposed between each opposed set of said abutments yieldably to retain said second element in normal relationship longitudinally of said casing element and to provide shock absorbing connections therebetween.

CHARLES F. WARREN.
WILLIAM R. SMITH.